3,573,309
8-PYRIDYL PURINES
Felix Gotthilf Bergmann, Jerusalem, Mordechai Abraham Kleiner, Petah-Tikva, and Moshe Rashi, Jerusalem, Israel, assignors to Yissum Research Development Company, Jerusalem, Israel
No Drawing. Filed July 30, 1968, Ser. No. 748,620
Claims priority, application Israel, Aug. 4, 1967, 28,456
Int. Cl. C07d 57/62
U.S. Cl. 260—252                                 14 Claims

ABSTRACT OF THE DISCLOSURE 8-pyridyl purines can be synthesized by condensation of 4,5-diaminopyrimidines with amidinopyridines. Protonation of the pyridine nitrogen causes a marked bathochromic shift of $\lambda_{max}$ in the 2- and 4-pyridyl derivatives, but not in the 3-pyridyl isomers. A similar effect is produced by quaternisation of the 4-, but not of the 3-pyridyl substituent. The 8-(N-methylpyridinium) group also facilitates greatly anion formation in the purine ring.

The new compounds showed a variety of biological activities, such as prolonged hypotension when injected into cats which were anesthetized with nembutal.

In a recent paper (F. Bergmann and M. Tamari, J. Chem. Soc., 1961, 4468), the condensation of 4,5-diaminopyrimidines with amidinium salts was proposed as a general method for the introduction of alkyl or aryl substitutents into position 8 of the purine ring. This reaction was apparently first used by Hull (R. Hull, J. Chem. Soc., 1958, 4069), for the synthesis of 6-diethylamino-2,8-dimethylpurine. We have now applied the method to the preparation of isomeric 8-(2'-, 3'- and 4'-pyridyl) purines, which are useful for enzymological and chemotherapeutic studies. These compounds have the same uses as analogous known compounds and, in addition, certain of these compounds exhibit brilliant yellow or yellow-green fluorescence. The compounds produced in accordance with the present invention include hypoxanthines, xanthines, 6-thioxanthines, 6-mercaptopurines and 8-pyridyl derivatives of purine itself.

Among the compounds of the present invention are
8-(2'-pyridyl) purine;
8-(3'-pyridyl) purine;
8-(4'-pyridyl) purine;
8-(2'-pyridyl)-6-mercaptopurine;
8-(3'-pyridyl)-6-mercaptopurine;
8-(4'-pyridyl)-6-mercaptopurine;
8-(2'-pyridyl)-6-thioxanthine;
8-(3'-pyridyl)-6-thioxanthine;
8-(4'-pyridyl)-6-thioxanthine;
8-(p-anisyl) hypoxanthine;
8-(p-nitrophenyl) hypoxanthine;
8-(2'-pyridyl) hypoxanthine;
8-(3'-pyridyl) hypoxanthine;
8-(4'-pyridyl) hypoxanthine;
8-(2'-pyridyl) xanthine;
8-(3'-pyridyl) xanthine;
8-(4'-pyridyl) xanthine;
8-(3'-pyridyl) hypoxanthine-1'-methiodide;
8-(4'-N-methylpyridinium) hypoxanthine betaine;
8-(3'-N-methylpyridinium) xanthine betaine;
8-(4'-N-methylpyridinium) xanthine betaine;
8-(2'-pyridyl)-6-methylthio purine;
8-(1'-methyl pyridinium) purines iodides;
8-(1'-methylpyridinium) purines betaines;
8-(2'-pyridyl)-3-methyl hypoxanthine;
8-(4'-N-methylpyridinium)-3-methyl-6-methylthio purine iodide;
8-(4'-N-methylpyridinium)-3-methyl-6-thio purine betaine;
8-(4'-pyridyl)-1-methyl-hypoxanthine;
8-(4'-pyridyl)-1-methyl-6-thiopurine;
8-(4'-pyridyl)-1-methyl-6-methylthiopurine;
8-(4'-N-methylpyridinium)-1-methyl-6-methylthiopurine iodide;
8-(2'-pyridyl)-3-methyl-6-methylthiopurine;
8-(2'-pyridyl)-6-thiopurine;
8-(2'-pyridyl)-3-methyl-6-thiopurine;
8-(4'-pyridyl)-6-thiopurine; and
8-(4'-pyridyl)-6-methylthio purine.

The compounds of the invention are represented by the following formulae:

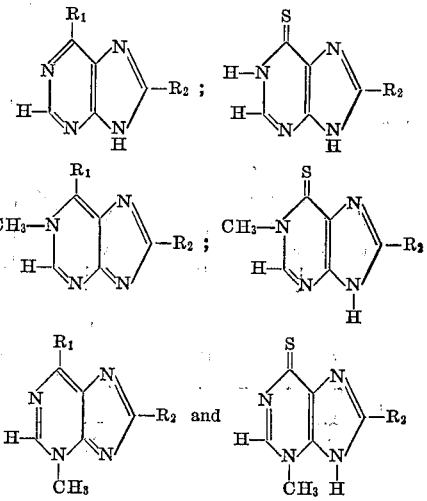

The novel hypoxanthines, xanthines and 6-thioxanthines of the present invention are obtained by direct condensation of the appropriate known 4,5-diaminopyrimidines with an amidine. To form the 6-mercaptopurine compounds, sulphuration of the corresponding hypoxanthines gives better results than the condensation of 4,5-diamino-6-mercaptopyrimidine with an amidine. The pyridyl purines No. 4 and 5 in Table 1 can be prepared by dethiation of the 6-mercaptopurines Nos. 9 and 10. However, the analogous reaction fails with 8-(2'-pyridyl)-6-mercaptopurine (No. 8) or its methylthio ether and 8-(2'-pyridyl) purine (No. 3) can only be obtained by condensation of 4,5-diaminopyrimidine with a salt of 2-amidinopyridine.

The N-methylpyridinium salts, listed in column (c) of Table 2, were obtained by two methods: (a) by treatment of the novel tert. pyridylpurines No. 21, 22 (hypoxanthines), 26 and 27 (xanthines) with methyl iodide in dimethylformamide (DMF); and (b) by condensation of 4,5-diaminopyrimidines with a quaternary amidinium salt, as exemplified in the following scheme for 4-pyridyl derivatives:

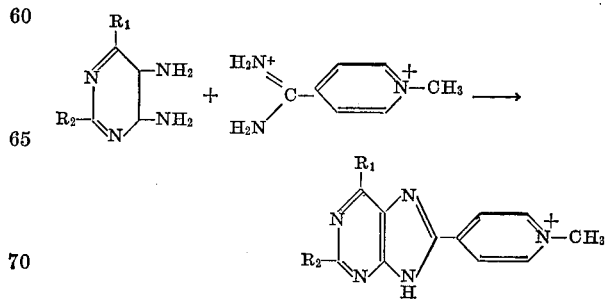

The identity of the products, prepared in either way, confirms that methylation in DMF has involved exclusively the pyridine nitrogen. However, quaternisation of 8-(2'-pyridyl)hypoxanthine (No. 20) and of the corresponding xanthine (No. 25) failed. Likewise, so far no method has been found to prepare 1-methyl-2-amidinopyridinium salts. Therefore all attempts to synthesize the required quaternary 2-pyridyl derivatives were unsuccessful.

Charts 3 and 4 show that in the novel N-methylpyridinium derivatives 21a, 22a, 26a and 27a the characteristic hypsochromic shift of $\lambda_{max}$ during an increase of pH from 1 to 5 is absent; otherwise the shape of the curves resembles those of FIGS. 1 and 2. The quaternary ions, when bearing no other charge, exhibit an absorption maximum similar to that of the protonated form of the corresponding tert. pyridyl derivatives. E.g. compound No. 22a absorbs at 342 m$\mu$, while the corresponding protonated form of No. 22 shows its maximum at 336 m$\mu$ and the uncharged molecule of No. 19 at 330 m$\mu$. On the other hand, the quaternary 3-pyridyl derivative (No. 21a) absorbs at 305 m$\mu$ and the protonated form of No. 21 at 303 m$\mu$ (see Table 2).

TABLE 1.—PHYSICAL PROPERTIES OF 8-SUBSTITUTED PURINES

| No. | Substituent at C-8 | $\lambda_{max}$ (m$\mu$) of Uncharged molecule (a) | $\lambda_{max}$ (m$\mu$) of Pyridinium cation (b) | $\Delta\lambda_{max}$ (b−a) | RF in solvent A | RF in solvent B | RF in solvent C | Fluorescence [1] |
|---|---|---|---|---|---|---|---|---|
| | | I. Derivatives of purine | | | | | | |
| 1 | H | 263 | | | | | | |
| 2 | Phenyl | 297 | | | .80 | | | Yellow. |
| 3 | 2-pyridyl | 299 | 308 | 9 | .70 | .73 | .17 | Do. |
| 4 | 3-pyridyl | 296 | 293 | −3 | .67 | .66 | .11 | Do. |
| 5 | 4-pyridyl | 289 | 302 | 13 | .68 | .66 | .17 | Do. |
| | | II. 6-mercaptopurines | | | | | | |
| 6 | H | 322 | | | | | | |
| 7 | Phenyl | 345 | | | .65 | | | Blue. |
| 8 | 2-pyridyl | 349 | 376 | 27 | .65 | .56 | .09 | Green-yellow. |
| 9 | 3-pyridyl | 346 | 358 | 12 | .54 | .44 | .09 | Yellow-brown. |
| 10 | 4-pyridyl | 351 | 378 | 27 | .48 | .40 | .10 | Yellowish. |
| | | III. 6-thioxanthines | | | | | | |
| 11 | H | 340 | | | | | | |
| 12 | Phenyl | 360 | | | .56 | | | Orange. |
| 13 | 2-pyridyl | 365 | 391 | 26 | .56 | .42 | .09 | Yellow. |
| 14 | 3-pyridyl | 363 | 370 | 7 | .53 | .40 | .04 | Do. |
| 15 | 4-pyridyl | 370 | 397 | 27 | .53 | .31 | .05 | Do. |

[1] The colors refer to solvent A.

TABLE 2.—PHYSICAL PROPERTIES OF 8-SUBSTITUTED HYPOXANTHINES AND XANTHINES

| No. | Substituent at C-8 | $\lambda_{max}$ (m$\mu$) Uncharged molecule (a) | $\lambda_{max}$ (m$\mu$) Pyridinium cation (b) | $\Delta\lambda_{max}$ (b−a) | $\lambda_{max}$ (m$\mu$) of N-methylpyridinium ion [1] (c) | $\Delta\lambda_{max}$ (c−a) | $\lambda_{max}$ (m$\mu$) Neutral form [2] (a) | Mono-anion (c) | Bis-anion (d) | (c−a) | $\lambda$(d−a) |
|---|---|---|---|---|---|---|---|---|---|---|---|
| | | I. Hypoxanthines | | | | | | | | | |
| 16 | H | 249 | | | | | 249 | 258 | 262.5 | 9 | 4.5 |
| 17 | Phenyl | 286 | | | | | 286 | 294 | 304 | 8 | 10 |
| 18 | p-Anisyl | 297 | | | | | 297 | 305 | ([3]) | 8 | |
| 19 | p-Nitrophenyl | 330 | | | | | 330 | 362 | 387 | 32 | 25 |
| 20 | 2-pyridyl | 300 | 329 | 29 | | | 300 | 307 | 316 | 7 | 9 |
| 21 | 3-pyridyl | 290 | 302 | 12 | 305 | 15 | 290 | 303 | [4] (310) | 13 | |
| 21(a) | | | | | | | [2] 305 | 317 | 331 | 12 | 14 |
| 22 | 4-pyridyl | 295 | 336 | 41 | | | 295 | 311 | 324 | 16 | 13 |
| 22(a) | | | | | | 342 | 47 | 342 | 366 | 392 | 24 | 26 |
| | | II. Xanthines | | | | | | | | | |
| 23 | H | 267 | | | | | 267 | 277 | 383 | 10 | 6 |
| 24 | Phenyl | 300 | | | | | 300 | 310 | 319 | 10 | 9 |
| 25 | 2-pyridyl | 311 | 350 | 39 | | | 311 | 321 | 333 | 10 | 12 |
| 26 | 3-pyridyl | 303 | 318 | 15 | 320 | 17 | 303 | 315 | 327 | 12 | 12 |
| 26(a) | | | | | | | 320 | 330 | 352 | 10 | 22 |
| 27 | 4-pyridyl | 311 | 355 | 44 | | | 311 | 326 | 344 | 15 | 18 |
| 27(a) | | | | | | 362 | 51 | 362 | 386 | 421 | 24 | 35 |

[1] These values refer to the form, in which the molecule bears no other charge except at the quaternary nitrogen of the pyridine ring.
[2] In the quaternary N-methylpyridinium derivatives 21(a) etc., the values in column (a) refer to the form bearing no other charge except at the pyridine nitrogen.
[3] This derivative does not form a bis-anion even when the pH is raised to 14.
[4] In compound 21 the increase of $\lambda_{max}$ still continues at pH 14 (see Fig.1).

TABLE 3

| No. | Substituent at C-8 | pK$_1$* bis-cation | pK$_2$* mono-cation | pK$_3$ mono-anion | pK$_4$ bis-anion | RF in solvent A | RF in solvent B | RF in solvent C | Fluorescence** |
|---|---|---|---|---|---|---|---|---|---|
| | | I. Hypoxanthines | | | | | | | |
| 17 | Phenyl | −1.3 | | 8.3 | 12.5 | .71 | .65 | .28 | Blue. |
| 18 | p-Anisyl | 0.5 | | 9.4 | | .54 | | | Do. |
| 19 | p-Nitrophenyl | 0.8 | | 7.5 | 12.0 | .40 | | | Orange-red. |
| 20 | 2-pyridyl | 0.6 | 1.8 | 8.5 | 12.4 | .63 | .48 | .11 | Greenish. |
| 21 | 3-pyridyl | −2 | 2.8 | 7.7 | 13 | .57 | .38 | .03 | Blue'. |
| 21(a) | N-methylpyridinium derivative. | −0.1 | | 5.5 | 11.7 | .33 | .15 | .01 | Yellow. |
| 22 | 4-pyridyl | 0 | 3.4 | 7.0 | 12.4 | .50 | .33 | .02 | Blue. |
| 22(a) | N-methylpyridinium derivative. | −0.5 | | 5.5 | 11.4 | .33 | .14 | .01 | Do. |
| | | II. Xanthines | | | | | | | |
| 24 | Phenyl | 0.6 | | 7.2 | 11.6 | .53 | .44 | .28 | Do. |
| 25 | 2-pyridyl | −1 | 1.5 | 7.0 | 11.6 | .50 | .39 | .09 | Green-blue. |
| 26 | 3-pyridyl | −2 | 2.5 | 6.8 | 11.7 | .45 | .30 | .03 | Do. |
| 26(a) | N-methylpyridinium derivative. | −1 | | 5.4 | 10.4 | .30 | .12 | .01 | Bluish. |
| 27 | 4-pyridyl | −2 | 3.5 | 6.6 | 10.9 | .42 | .18 | .02 | Green-blue. |
| 27(a) | N-methylpyridinium derivative. | −0.5 | | 4.4 | 10.4 | .28 | .09 | .01 | Blue. |

*The pK$_1$ values characterize the binding of two protons in the tert. pyridyl derivatives and of a single proton in all other purines listed. The pK$_2$ values refer to the form, in which only the pyridine nitrogen has been protonated.
**The colors refer to solvent A.

TABLE 4.—EXPERIMENTAL CONDITIONS FOR THE CONDENSATION OF 4,5-DIAMINOPYRIMIDINES WITH AMIDINE SALTS

| No. | Substituent at C-8 | Reaction conditions | | | M.P. °C. or dec. point | Solvent for crystallization | Crystal form | Analyses | | | | | | | |
|---|---|---|---|---|---|---|---|---|---|---|---|---|---|---|---|
| | | Temp., °C. | Time, min. | Yield, percent | | | | Calculated | | | | Found | | | |
| | | | | | | | | C | H | N | S | Formula | C | H | N | S |

I. Derivatives of purine by condensation with 4,5-diaminopyrimidine,

| 3 | 2-pyridyl | 180-200 | 5 | 71 | 300 | Water | Hairlike needles | 58.3 | 3.9 | 34.0 | | $C_{10}H_7N_5 \cdot 0.5H_2O$ | 58.4 | 3.8 | 34.6 | |

II. Hypoxanthines, by condensation with 4,5-diamino-6-hydroxypyrimidine

| 18 | p-Anisyl | 210 | 15 | 60 | 310 | 50% acetic acid | Needles | 59.5 | 4.1 | 23.1 | | $C_{12}H_{10}N_4O_2$ | 59.3 | 4.2 | 23.2 | |
| 19 | p-Nitrophenyl | 260 | 15 | 53 | 305 | DMF | Yellow boats | 51.4 | 2.7 | 27.2 | | $C_{11}H_7N_5O_3$ | 51.2 | 3.0 | 27.2 | |
| 20 | 2-pyridyl | 160-180 | 20 | 83 | 310 | DMF-water | Needles | 56.3 | 3.3 | 32.9 | | $C_{10}H_7N_5O$ | 56.5 | 3.1 | 33.1 | |
| 21 | 3-pyridyl | 190 | 15 | 81 | 310 | NaOH—NH$_4$Cl[1] | do | | | | | | 55.7 | 3.5 | 32.6 | |
| 22 | 4-pyridyl | 180-200 | 5 | 70 | 310 | NaOH—NH$_4$Cl | do | | | | | | 55.9 | 3.5 | 32.9 | |

III. Xanthines, by condensation with 4,5-diaminouracil

| 25 | 2-pyridyl | 200-220 | 5 | 62 | 300 | Acetic acid-isopropanol-water | Needles | 52.4 | 3.1 | 30.6 | | $C_{10}H_7N_5O_2$ | 52.0 | 3.3 | 31.2 | |
| 26 | 3-pyridyl | 200 | 15 | 40 | 310 | NaOH—NH$_4$Cl | do | | | | | | 51.9 | 3.6 | 30.6 | |
| 27 | 4-pyridyl | 200-220 | 10 | 80 | 310 | NaOH—NH$_4$Cl | do | 50.4 | 3.4 | 29.4 | | $C_{10}H_7N_5O_2 \cdot 0.5H_2O$ | 50.7 | 3.2 | 29.7 | |

IV. 6-Thioxanthines, by condensation with 4,5-diamino-6-thiouracil

| 13 | 2-pyridyl | 180-190 | 10 | 45 | 300 | DMF-water | Yellow plates | 49.0 | 2.9 | 28.6 | 13.1 | $C_{10}H_7N_5OS$ | 49.0 | 3.4 | 28.6 | 13.4 |
| 14 | 3-pyridyl | 190 | 15 | 94 | 310 | NaOH—NH$_4$Cl | Yellow prisms | 47.2 | 3.1 | 27.6 | 12.6 | $C_{10}H_7N_5OS \cdot 0.5H_2O$ | 46.6 | 2.7 | 27.4 | 12.5 |
| 15 | 4-pyridyl | 260 | 20 | 64 | 310 | NaOH—NH$_4$Cl | Yellow needles | 48.1 | 3.0 | | 12.8 | $C_{10}H_7N_5OS \cdot 0.25H_2O$ | 48.0 | 3.4 | | 12.8 |

[1] For this method of purification see EXPERIMENTAL.

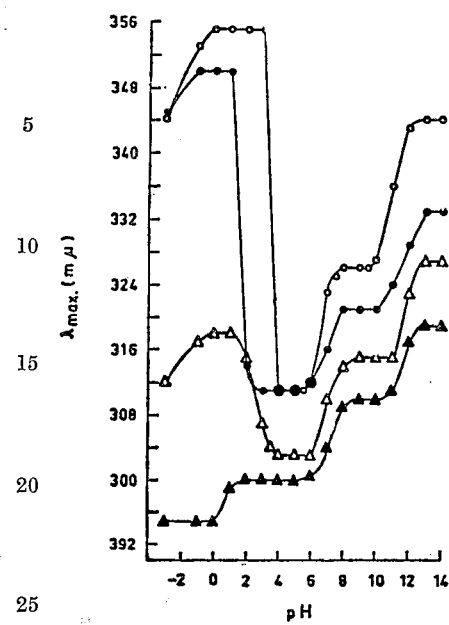

CHART 1. Long-wave absorption maxima of 8-substituted hypoxanthines as function of pH.
●——●, 8-(4'-pyridyl) hypoxanthine (No. 22);
○——○, 3-pyridyl isomer (No. 21);
△——△, 2-pyridyl isomer (No. 20);
▲——▲, 8-phenylhypoxanthine (No. 17).

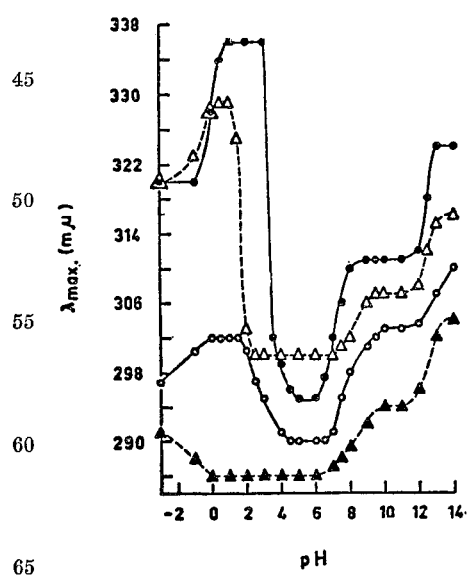

CHART 2. Absorption maxima of 8-substituted xanthines as function of pH.
●——●, 8-(4'-pyridyl) xanthine No. 27);
△——△, 3-pyridyl isomer (No. 26);
●——●, 2-pyridyl isomer (No. 25);
▲——▲, 8-phenylxanthine (No. 24).

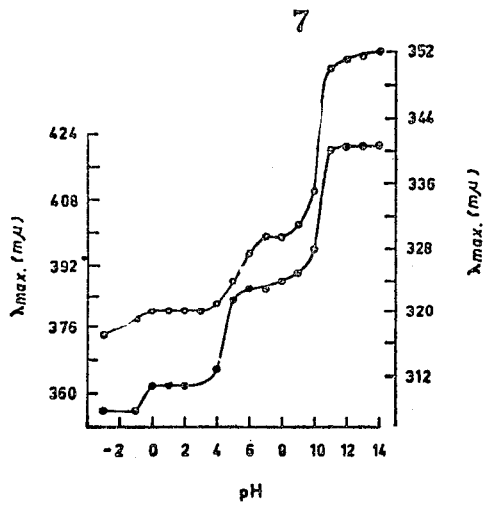

CHART 3. Absorption maxima of 8-(N-methylpyridinium) hypoxanthines as function of pH.
o——o, 4-pyridyl derivative (No. 22a; left-hand ordinate);
●——●, 3-pyridyl derivative (No. 21a; right-hand ordinate).

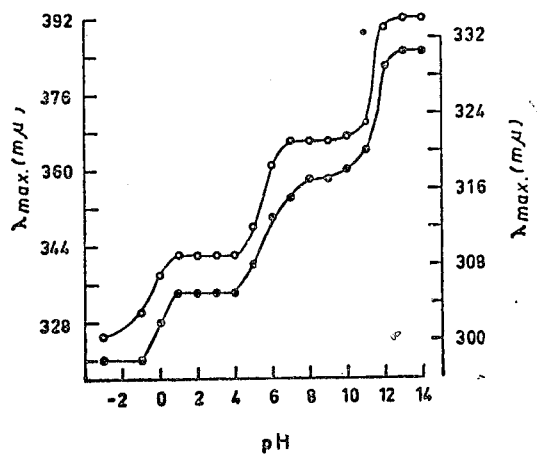

CHART 4. Absorption maxima of 8-(N-methylpyridinium) xanthines as function of pH.
●——●, 4-pyridyl derivative (No. 27a; left-hand ordinate);
o——o, 3-pyridyl derivative (No. 26a; right-hand ordinate).

ILLUSTRATIVE EXAMPLES

Ultraviolet absorption spectra were determined on a Beckman DU spectrophotometer. For measuring changes of $\lambda_{max}$ as function of pH, the following buffers were employed: pH −3, 27 N—$H_2SO_4$; −1, 11N—$H_2SO_4$; pH 0–3, $HClO_4$; 4 and 5, 0.1 M acetate buffer; pH 6–8, 0.1 M phosphate buffer; 9 and 10, 0.1 M borate buffer; pH 11–14, NaOH. Paper chromatograms were developed on Whatman paper No. 1 by the descending method, using the following solvents: A (neutral solvent), 95% EtOH-dimethylformamide-$H_2O$ 3:1:1 (v./v.); B, n-butanol-AcOH-$H_2O$ 12:3:5 (v./v.); C (strongly acidic), 95% EtOH-AcOH-5% HCl 17:1:1 (v./v.). Spots were detected by their fluorescence under a Mineralight ultraviolet lamp ($\lambda \sim 255$ m$\mu$).

Preparation of amidines 2-amidinopyridine hydrochloride (F. C. Schaefer and G. A. Peters, J. Org. Chem., 1961, 26, 412), the corresponding 3-amidino derivative (H. J. Barber and R. Slack, J. Amer. Chem. Soc., 1944, 66, 1607) and the 4-isomer (F.C. Schaefer and G. A. Peters, J. Org. Chem., 1961, 26, 412; T. S. Gardner, E. Wenis and J. Lee, J. Org. Chem., 1954, 19, 753) have been described in the literature. We have found that all three isomers can be conveniently prepared by the method of Schaefer and Peters (F. C. Schaefer and G. A. Peters, J. Org. Chem., 1961, 26, 412) in yields of 70–75%. 1-methyl-4-amidinopyridinium salt was synthesized according to Poziomek (E. J. Poziomek, J. Org. Chem., 1963, 28, 590).

1-methyl-3-amidinopyridinium iodide hydriodide was obtained as follows: A solution of 3-amidinopyridine hydrochloride (15 g.) in DMF (150 ml.) and methyl iodide (30 ml.) was kept at room temperature for 24 hr. The solvent was removed in vacuo and the residue recrystallized from methanolethyl acetate (4:1, v./v.). Yellowish needles (30 g., 80%), M.P. 214°; $\lambda_{max}$ (PH 7) 225 and 262 m$\mu$ (Found (percent): C, 22.1; H, 2.9; N, 10.7; I, 64.6. $C_7H_{11}N_3I_2$ requires (percent): C, 21.5; H, 2.8; N, 10.7; I, 65.0).

p-Anisamidine hydrochloride was prepared according to Fanta and Hedman (P. F. Fanta and E. A. Hedman, J. Amer. Chem. Soc., 1956, 78, 1434) and p-nitrobenzamidine by the method of Andrews et al. (C. H. Andrews, H. King and J. Walerr, Proc. Roy. Soc. (London), 1946, B 133, 20). The pyrimidines were all synthesized according to the literature: 4,5-diaminopyrimidine (D. J. Brown, J. Appl. Chem., 1952, 2, 239); its 6-hydroxy derivative (A. Albert, D. J. Brown and G. Cheeseman, J. Chem. Soc., 1951, 474); 4,5-diaminouracil (M. T. Bogert and D. Davidson, J. Amer. Chem. Soc., 1933, 55, 1668); 4,5-diamino-6-thiouracil (G. Levin, A. Kalmus and F. Bergmann, J. Org. Chem., 1960, 25, 1752); 4,5-diamino-6-hydroxy-3-methylpyrimidine (Brown and Jacobsen, J. Chem. Soc. 1965, p. 1175) and the 1-methyl derivative thereof (Elion, J. Org. Chem., 1962, 27, 2478).

8-substituted purines

General procedure.—The appropriate 4,5-diaminopyrimidine, usually as free base, was thoroughly mixed in a mortar with two equivalents each of anhydrous sodium acetate and the amidine salt. The temperature of the mixture was slowly raised until evolution of ammonia set in, and heating was continued until the melt resolidified. The cake was then treated with 1 N-NaOH and the mixture decolorized with charcoal and filtered. The hot filtrate was neutralized with glacial acetic acid or by addition of solid ammonium chloride. The special conditions required for isolation of each product and the analytical results are summarized in Table 4.

EXAMPLE 1

6-mercapto-8-phenylpurine (No. 7)

A mixture of 8-phenylhypoxanthine (No. 17), (2.2 g.), phosphorous pentasulphide (10 g.) and dry pyridine (110 ml.) was stirred and refluxed for 3.5 hr. The solvent was removed in vacuo, and the residue treated with cold water (40 ml.) for 30 min. and subsequently heated to 70° for 60 min. The insoluble portion was taken up in 1 N-NaOH, the mixture warmed and treated with charcoal and the filtered solution acidified with glacial acetic acid. Recrystallization from dil. acetic acid gave light-brown branched needles (2.2 g., 93%), decomposing at 330° (Found (percent): C, 57.2; H, 3.6; N, 24.2; $C_{11}H_8N_4S$ requires (percent): C, 57.9; H, 3.5; N, 24.6).

EXAMPLE 2

8-phenyl-6-thioxanthine (No. 12)

This compound was obtained by sulphuration of 8-phenylxanthine (No. 24), using the procedure just described. Branched needles, (93%), decomposing at 330° (Found (percent): C, 52.8; H, 3.5; N, 22.5. $C_{11}H_8N_4OS \cdot 0.5 H_2O$ requires (percent): C, 52.2; H, 3.6; N, 22.1).

The novel 6-thioxanthines (No. 13, 14 and 15) and the novel hypoxanthines (No. 18, 19, 20, 21 and 22) were obtained by direct condensation of the appropriate known 4,5-diaminopyrimidines with an amidine following the process of Bergmann and Tamari. (J. Chem. Soc., 1961, 4468).

EXAMPLE 3

8-(2'-pyridyl)hypoxanthine (No. 20)

An intimate mixture of 5 grams of 4,5-diamino-6-hydroxypyrimidine (free base), 10 grams of 2-amidinopyridine hydrochloride and 5 grams anhydrous sodium acetate was heated to 160–180° for 20 minutes. The cake was treated with 1 N-NaOH; the mixture was boiled in the presence of active charcoal and filtered. The filtrate was neutralized by the addition of solid ammonium chloride. Recrystallization from DMF—$H_2O$=1:1 gave colorless needles of dec. p. ~310°. Yield 83% $\lambda_{max}$ (pH 5) 299 m$\mu$, (pH 10) 307 m$\mu$.

Analysis.—Calcd. for $C_{10}H_7N_5O$ (percent): C, 56.3; H, 3.3; N, 32.9. Found (percent): C, 56.5; H, 3.1; N, 33.1.

EXAMPLE 4

8-(3'-pyridyl)hypoxanthine (No. 21)

An intimate mixture of 4,5-diamino-6-hydroxypyrimidine (free base) (5 g.), 3-amidinopyridine hydrochloride (10 g.) and anhydrous sodium acetate (5 g.) was heated to 190° for 15 minutes. The cake was treated with 1 N-NaOH and the mixture boiled with charcoal and filtered. The filtrate was neutralized by addition of solid $NH_4Cl$. Purification was effected by the same procedure as above. The product, obtained in 81% yield, forms colorless needles, dec. p. >310°; $\lambda_{max}$ (pH 6) 290 m$\mu$; (pH 1) 302 m$\mu$; (pH 11) 303 m$\mu$.

Analysis.—Calcd. for $C_{10}H_7N_5O$ (percent): C, 56.3; H, 3.3; N, 32.9. Found (percent): C. 55.8; H, 3.5; N, 32.6.

EXAMPLE 5

8-(4'-pyridyl)hypoxanthine (No. 22)

An intimate mixture of 4,5-diamino-6-hydroxypyrimidine (free base) (5 g.), 4-amidinopyridine hydrochloride (10 g.) and anhydrous sodium acetate (5 g.) was heated in a metal bath to 180–200° during 5 minutes. The cake was treated with 1 N-NaOH and the mixture then boiled briefly in the presence of active charcoal. The mixture was filtered and to the filtrate solid ammonium chloride was added, until the pH declined to about 7.5. The precipitate was separated after cooling and purified by dissolution in 1 N-NaOH and was neutralized with ammonium chloride. Colorless needles of dec. p. ~310°; yield 70% $\lambda_{max}$ (pH 9) 311 m$\mu$, (pH 6) 295 m$\mu$.

Analysis.—Calcd. for $C_{10}H_7N_5O$ (percent): C, 56.3; H, 3.3; N, 32.9. Found (percent): C, 55.9; H, 3.5; N, 32.9.

EXAMPLE 6

8-(2'-pyridyl)-6-thioxanthine (No. 13)

An intimate mixture of 4,5-diamino-6-thiouracil (free base) (5 g.), 2-amidinopyridine hydrochloride (10 g.) and anhydrous sodium acetate (5 g.) was heated to 180–190° for 10 minutes. The cake was treated with 1 N-NaOH and the mixture boiled in the presence of active charcoal and filtered. The filtrate was neutralized with solid ammonium chloride and cooled. The precipitate crystallized from DMF—$H_2O$=1:1 in yellow plates of dec. p. ~300°, yield 45%. $\lambda_{max}$ (pH 8) 371 m$\mu$; (pH 1.0) 391 m$\mu$.

Analysis.—Calcd. for $C_{10}H_7N_5OS$ (percent): C, 49.0; H, 2.9; N, 28.6; S, 13.1. Found (percent): C, 49.0; H, 3.4; N, 28.6; S, 13.4

EXAMPLE 7

8-(3'-pyridyl)-6-thioxanthine (No. 14)

An intimate mixture of 4,5-diamino-6-thiouracil (free base) (5 g.), 3-amidinopyridine hydrochloride (10 g.) and anhydrous sodium acetate (5 g.) was heated for 15 minutes to 190°. The cake was dissolved in 1 N-NaOH, the mixture boiled with active charcoal and filtered. The filtrate was neutralized by addition of solid ammonium chloride. Purification by the same method gave yellow prisms of dec. p. ~310°, yield 94%; $\lambda_{max}$ (pH 8) 363 m$\mu$.

Analysis.—Calcd. for $C_{10}H_7N_5OS \cdot 0.5 H_2O$ (percent): C, 47.2; H, 3.1; N, 27.6; S, 12.6. Found (percent): C, 46.6; H, 2.7; N, 27.4; S, 12.7

EXAMPLE 8

8-(4-pyridyl)-6-thioxanthine (No. 15)

An intimate mixture of 4,5-diamino-6-thiouracil (free base) (5 g.), 4-amidinopyridine hydrochloride (10 g.) and anhydrous sodium acetate (5 g.) was heated to 260° for 20 minutes. The cake was treated as before. Purification in the system 1 N-NaOH—$NH_4Cl$ gave yellow needles of dec. p. ~310°. Yield 64%; $\lambda_{max}$ (pH 8.0) 372 m$\mu$; (pH 1) 397 m$\mu$.

Analysis.—Calcd. for $C_{10}H_7O_5NS \cdot 0.25 H_2O$ (percent): C, 48.1; H, 3.0; S, 12.8. Found (percent): C, 48.0; H, 3.4; S, 12.8.

EXAMPLE 9

8-(2'-pyridyl)-6-mercaptopurine (No. 8)

Thiation of the appropriate hypoxanthine (No. 20) was carried out in boiling B-picoline. From dilute acetic acid yellowish needles (80%), decomposing at 300° (Found (percent): C, 52.1; H, 3.1; N, 30.9; S, 13.9. $C_{10}H_7N_5S$ requires (percent): C, 52.4; H, 3.1; N, 30.6; S, 13.9).

EXAMPLE 10

6-methylthio-8-(2'-pyridyl)purine

The 6-mercapto derivative No. 8 (1 g.) in 1 N-NaOH (25 ml.) was stirred with metyl iodide (1.7 g.) at room temperature for 2 hr. Acidification with glacial acetic acid caused precipitation of the thio ether. From dil. acetic acid white needles (0.43 g., 45%), decomposing at 300°; $\lambda_{max}$ (pH 8) 241 and 326 m$\mu$ (Found (percent): C, 54.2; H, 3.6; N, 29.2; S, 13.2. $C_{11}H_9N_5S$ requires (percent): C, 54.3; H, 3.7; N, 28.8; S, 13.2).

EXAMPLE 11

8-(3'-pyridyl)-6-mercaptopurine (No. 9)

This compound was prepared from the hypoxanthine 21 by the procedure described for compound No. 8. From dilute acetic acid yellow prisms (68%) decomposing at 310° (Found (percent): C, 52.4; H, 3.2; N, 30.8; S, 13.8).

EXAMPLE 12

8-(4'-pyridyl)-6-mercaptopurine (No. 10)

This product was prepared as described directly above for the isomers. For purification, it was dissolved in 1 N-NaOH and precipitated by addition of solid ammonium chloride. Yellow needles (82%), decomposing at 300° (Found (percent): C, 52.0; H, 3.4; N, 30.3; S, 13.5).

EXAMPLE 13

8-(3'-pyridyl)purine (No. 4)

A solution of 6-mercapto-8-(3'-pyridyl)purine (No. 9) (4 g.) in 1 N-NaOH (400 ml.) was refluxed for 3.5 hr.

in the presence of Raney nickel (28 g.). After the catalyst had been removed by filtration, the solution was neutralized and brought to dryness in vacuo. The residue was extracted with concentrated ammonia at 80°, the mixture filtered and the filtrate brought to pH 6.5 by addition of acetic acid. Upon cooling overnight, 1.6 g. (34%) of white crystals precipitated. Recrystallization from water gave colorless needles decomposing at 300°. (Found (percent): C, 61.1; H, 3.9; N, 35.4. $C_{10}H_7N_5$ requires (percent): C, 60.9; H, 3.6; N, 35.5).

EXAMPLE 14

8-(4'-pyridyl)purine (No. 5)

Prepared as above by desulphurization of the 6-mercaptopurine No. 10. From water colorless needles (80%), decomposing at 300° (Found (percent): C, 61.0; H, 3.4; N, 35.7). No. 3 was prepared in the same manner from the 6-mercaptopurine No. 8.

EXAMPLE 15

Xanthines (Nos. 25, 26 and 27)

The 2-pyridyl (No. 25), the 3-pyridyl (No. 26) and the 4-pyridyl (No. 26) xanthines were prepared by condensation of 4,5-diaminouracil with the proper amidine salt and anhydrous sodium acetate under the conditions set forth in Table 4.

EXAMPLE 16

Preparation of 8-(1'-methylpyridinium)purines iodides or betaines 8-(3'-pyridyl)hypoxanthine 1'-methiodide (No. 21a).—(a) A suspension of compound No. 21 (1.3 g.) in DMF (120 ml.) and water (60 ml.) was stirred with methyl iodide (20 ml.) at 50° for 20 hrs. The solution, which had become homogeneous, was brought to dryness in vacuo and the residue was crystallized from 50% isopropanol. Bushels of needles (1.2 g., 55%), M.P. 248–250° (Found (percent): C, 37.1; H, 3.2; N, 19.5. $C_{11}H_{10}N_5OI$ requires (percent): C, 37.2; H, 2.8; N, 19.7). (b) A mixture of 4,5-diamino-6-hydroxypyrimidine (A. Albert, D. J. Brown and G. Cheeseman, J. Chem. Soc., 1951, 474) (1.3 g.) and 1-methyl-3-amidino-pyridinium iodide hydriodide (3 g.) was heated to 170° for 5 min. The resulting black tar was extracted with hot water and the mixture filtered. From the filtrate, the condensation product was precipitated by addition of isopropanol-ethyl acetate (1:1, v./v.). Crystallization from 50% isopropanol gave 0.3 g. (11%) of colorless needles, identical in every respect with the product obtained by procedure (a).

EXAMPLE 17

8-(3'-N-methylpyridinium)xanthine betaine (No. 26a)

(a) Methylation of the xanthine 26 was carried out in 80% DMF at 50° during 6 hr. The quaternary salt (65% yield) settled directly upon cooling at the reaction mixture. The salt was dissolved in warm water and ammonia added to the solution. The betaine of 26a crystallized in colorless needles, decomposing at 310°. (Found (percent): C, 52.2; H, 4.3; N, 28.1. $C_{11}H_9N_5O_2 \cdot 0.5 H_2O$ requires (percent): C, 52.4; H, 4.0; N, 27.8). The picrate of No. 26a formed yellow prisims for water, M.P. 314°. (Found (percent): C, 43.1; H, 3.0; N, 24.2. $C_{17}H_{12}N_8O_9$ requires (percent): C, 43.2; H, 2.5; N, 23.7%). (b) An intimate mixture of 4,5-diaminouracil (M.T. Bogert and D. Davidson, J. Amer. Chem. Soc., 1933, 55, 1668) (1.2 g.), 1-methyl-3-amidinopyridinium iodide hydriodide (3 g.) and anhydrous sodium acetate (2 g.) was heated to 220° for 10 min. The cake was extracted with hot water and the mixture filtered. Upon cooling the filtrate, the condensation product (20%) precipitated as iodide. It was converted into the betaine, which proved to be identical with the compound obtained by procedure (a).

EXAMPLE 18

8-(4'-N-methylpyridinium)hypoxanthine betaine (No. 22a)

(a) A suspension of the hypoxanthine 22 (2 g.) in 70% DMF (200 ml.) and methyl iodide (20 ml.) was stirred at 75° for 5 hr. The reaction mixture, which had become homogeneous, was brought to dryness and the residue dissolved in dil. ammonia. After decolorization with charcoal, filtration and cooling the betaine (1.5 g., 70%) crystallized in yellow, elongated plates, which were however difficult to purify. For analysis, the picrate proved satisfactory. Yellow plates, decomposing ~300° (Found (percent): C, 44.6; H, 2.7; N, 24.5. $C_{17}H_{12}N_8O_8$ requires (percent): C, 44.7; H, 2.6; N, 24.6). (b) A mixture of 4,5-diamino-6-hydroxypyrimidine (A. Albert, D. J. Brown and G. Cheeseman, J. Chem. Soc., 1951, 474) (4.5 g.), 1-methyl-4-amidopyridinium iodide hydriodide (4 g.) and sodium acetate (2 g.) was heated to 205° for 10 min. The cake was extracted with hot ammonia, the solution decolorized with charcoal and the filtrate cooled. The betaine of 22a was obtained in 30% yield. Its picrate was identical with the one described under (a).

EXAMPLE 19

8-(4'-N-methylpyridinium)xanthine betaine (No. 27a)

(a) Condensation of 4,5-diaminouracil with the appropriate amidine was carried out at 210° during 25 min. The betaine, obtained as before, crystallized from water in hairlike needles of M.P. 300°; yield 30% (Found (percent): C, 50.0; H, 4.4: N, 26.0. $C_{11}H_9N_5O_2 \cdot H_2O$ requires (percent): C, 50.6; H, 4.2; N, 26.7). (b) A suspension of the xanthine 27 (2 g.) in 70% DMF (200 ml.) and methyl iodide (50 ml.) was refluxed for 16 hr. The mixture was filtered and the filtrate brought to dryness. The residue crystallized upon trituration with ethyl acetate. Yield 1.6 g., 50%. The product was identical in all properties with the compound, resulting from procedure (a).

EXAMPLE 20

3-methyl-8(2'-pyridyl)hypoxanthine

An intimate mixture of 4,5-diamino-6-hydroxy-3-methyl-pyrimidine (14 g.) and 2-amidinopyridine hydrochloride (28 g.) was heated to 180° for 30 min. The cake was extracted with boiling methanol, the liquid decanted, decolorised with charcoal and filtered. The substance crystallised in colorless rods of dec. p. 300°; yield 48%.

$\lambda_{max}$ (pH 8) 314 m$\mu$; $R_F$ (solvent A) 0.62

Analysis.—Calcd. for $C_{11}H_9N_5O$ (percent): C, 58.1; H, 3.9; N, 30.8. Found (percent): C, 57.7; H, 4.2; N, 31.2.

EXAMPLE 21

3-methyl-6-methylthio-8(4'-N-methylpyridinium) purine iodide

8(4'-pyridyl)-6-mercaptopurine (Example 12) (10 g.) was suspended in DMF (1 liter). The mixture was stirred and refluxed with methyl iodide (60 ml.) for 2.5 hr. The solvent was removed in vacuo and the residue triturated with ethanol. The solid material (9.5 g. = 54%) crystallised from water in yellow needles, dec. >280°.

Analysis.—Calcd. for $C_{13}H_{14}N_5SI$ (percent): C, 29.1; H, 3.5; N, 17.5; S, 8.0. Found (percent): C, 39.2; H, 3.6; N, 18.0; S, 8.2.

$\lambda_{max}$ (pH 8) 278 and 369 m$\mu$; $R_F$ (A) 0.44

EXAMPLE 22

3-methyl-8(4'-N-methylpyridinium)-6-thiopurine betaine

Into a solution of ammonia (200 ml.), that was saturated at 0° with gaseous hydrogen sulfide, 3-methyl-6-methylthio-8(4'-N-methylpyridinium)purine iodide (Example 21) (20 g.) was added in small portions. The mixture was kept at 0° and $H_2S$ was bubbled through for a further 30 min. The precipitate crystallised from water in reddish needles, dec. p.>200°; yield, 30%.

$\lambda_{max}$ (pH 8) 430 m$\mu$; $R_F$ (A) 0.67

*Analysis.*—Calcd. for $C_{12}H_{11}N_5S \cdot 2H_2O$ (percent): C, 49.1; H, 5.1; N, 23.9; S, 10. Found (percent): C, 49.1; H, 5.1; N, 23.9; S, 10.9.

EXAMPLE 23

1-methyl-8(4'-pyridyl) hypoxanthine

An intimate mixture of 4,5-diamino-6-hydroxy-1-methylpyrimidine (20 g.), 4-amidinopyridine hydrochloride (60 g.) and anhydrous sodium acetate (20 g.) was heated to 220–240° for 15 min. The cake was extracted with 10% ammonia, the mixture filtered and the filtrate acidified with acetic acid. Yellow needles of dec. p.>300°, yield: 60%.

$\lambda_{max}$ (pH 8) 312–313 m$\mu$; $R_F$ (A) 0.63

*Analysis.*—Calcd. for $C_{11}H_9N_5O$ (percent): C, 58.1; H, 4.0; N, 30.8. Found (percent): C, 58.0; H, 4.0; N, 31.0.

EXAMPLE 24

1-methyl-8(4'-pyridyl)-6-thiopurine

A suspension of 1-methyl-8(4'-pyridyl) hypoxanthine (see Example 23) (24 g.) and of phosphorous pentasulfide (72 g.) in $\beta$-picoline (1 liter) was stirred and refluxed for 2 hr. The solvent was distilled off, the residue treated with warm water and filtered. The solid portion was dissolved in 1N-NaOH, the solution decolorised with charcoal and filtered. The sodium salt of the desired product crystallised upon cooling. It was removed by filtration, dissolved in hot water and the thiopurine precipitated as free base by addition of ammonium chloride.

1-methyl-8(4'-pyridyl)-6-thiopurine crystallises in yellow needles, dec. p.>300°, yield, 40%.

$\lambda_{max}$ (pH 8) 262; 352–353 m$\mu$; $R_F$ (A) 0.67

*Analysis.*—Calcd. for $C_{11}H_9N_5S$ (percent): C, 54.3; H, 3.7; N, 28.8; S, 13.2. Found (percent): C, 54.2; H, 4.0; N, 29.0; S, 13.1.

EXAMPLE 25

1-methyl-6-methylthio-8(4'-pyridyl) purine

A solution of the thio compound, described in Example 24 (10 g.) in 0.5 N-NaOH (120 ml.) was stirred at room temperature with methyl iodide (3.2 ml.) for 90 min. The precipitate was removed and recrystallised from water. Yellowish needles, dec.>190°; yield, 68%.

$\lambda_{max}$ (pH 8) 335 m$\mu$; $R_F$ (A) 0.64

*Analysis.*—Calcd. for $C_{12}H_{11}N_5S$ (percent): C, 56.0; H, 4.2; N, 27.2. Found (percent): C, 55.4; H, 4.6; N, 27.7.

EXAMPLE 26

1-methyl-6-methylthio-8(4'-methylpyridinium) purine iodide

A solution of the thioether, described in Example 25, (10 g.) in DMF (600 ml.) and methyl iodide (30 ml.) was stirred at room temperature for 2 hrs. The solid that had separated was recrystallised from 90% isopropanol Yellowish needles, M.P. 245°; yield quantitative.

$\lambda_{max}$ (pH 8) 276, 361 m$\mu$; $R_F$ (A) 0.32

*Analysis.*—Calcd. for $C_{13}H_{14}N_5SI$ (percent): C, 39.1; H, 3.5; N, 17.5; S, 8.0. Found (percent): C, 39.1; H, 3.8; N, 17.6; S, 7.7.

EXAMPLE 27

3-methyl-6-methylthio-8(2'-pyridyl) purine

A suspension of 8(2'-pyridyl)-6-mercaptopurine (Example 9) (25 g.) in DMF (600 ml.) and methyl iodide (50 ml.) was stirred and refluxed for 1 hr. The solvent was removed in vacuo, the residue dissolved in warm water and the pH was adjusted to 10 by addition of ammonia to precipitate the methylthio ether as free base. From water, white needles, M.P. 252°; yield, 32%.

$\lambda_{max}$ (pH 8) 243, 340 m$\mu$; $R_F$ (A) 0.67

*Analysis.*—Calcd. for $C_{12}H_{11}N_5S$ (percent): C, 56.0; H, 4.3; N, 27.2; S, 12.5. Found (percent): C, 56.5; H, 4.3; N, 27.2; S, 12.6.

(II) Biological activities.—The compounds described in the foregoing examples were tested for biological activity and showed results as exemplified by the following:

(1) Marked and prolonged hypotension was produced by intravenous injection into cats, which were anesthetized with nembutal, of 8-pyridylxanthines
3-methyl-6-methylthio-8(2'-pyridyl)purine (Example 24)
3-methyl-8(4'-N-methylpyridinium)-6-thiopurine betaine (Ex. 19a)
3-methyl-6-methylthio-8(4'-N-methylpyridinium) purine iodide, (Ex. 19)

(2) The 8-pyridyl-6-thiopurines and their S-methyl ethers showed marked inhibition of EO 771 mammary adenocarcinoma, S–180 sarcoma and Ehrlich ascites carcinoma in mice—as follows:

BR–1=8-(2'-pyridyl)-6-thiopurine
BR–2=8-(2'-pyridyl)-6-methylthiopurine
BR–3=8-(2'-pyridyl)-3-methyl-6-thiopurine
BR–4=8-(2'-pyridyl)-3-methyl-6-methylthiopurine
BR–8=8-(4'-pyridyl)-6-thiopurine
BR–9=8-(4'-pyridyl)-6-methylthiopurine The compounds were received as crystalline substances with known formulas. They were not soluble in the concentrations suitable for tumor studies, therefore they were homogenized by using a homogenizer of the Potter-Elevehjem type; the suspending agent used was 0.5% carboxymethyl cellulose in saline. All materials were injected intraperitoneally in mice at a volume not exceeding 0.5 ml. per injection.

Tumors.—The experimental mouse tumors used were EO771 mammary adenocarcinoma, Sarcoma 180 (S–180) and Ehrlich ascites carcinoma (Lettre).

The solid tumors EO771 and S–180 were transplanted by the usual aseptic procedures using the trocar method. Implantation of Ehrlich ascites carcinoma was performed by i.p. injection of $2 \times 10^6$ tumor cells per mouse.

Hosts.—S–180 and Ehrlich ascites carcinoma were grown in random bred Swiss mice and EO771 in $C_{57}BL$ inbred mice.

Chemotherapy.—All compounds were injected intraperitoneally 24 hours after tumor implantation. Injections were repeated every 24 hours. The number of days of treatment, however, varied with the test system (Tables 1, 2, 3). All compounds were tested using groups of 6–8 mice for each type of tumor. Death and body weight changes in the treated and control groups were obtained and recorded (Tables 5, 6 7). The animals were sacrificed one day after the last injection for the evaluation of the carcinostatic effect. The tumor volume (TV) as well as the total packed cell volume (TPCV) for the Ehrlich ascites carcinoma and the corresponding tumor weight for S–180 and EO771 were established according to Cancer Chemotherapy National Service Center of United States (CCNSC) specifications (1959).

The results are given as percent of tumor growth inhibition as compared to tumor growth on the control animals.

Results.—Results obtained are shown in Tables 5, 6 and 7. Experiments were repeated whenever a positive response was obtained (50% inhibition of tumor growth was considered as a positive result; the same criteria is used by CCNSC of USA).

Analysis of Table 5 shows that the Ehrlich ascites carcinoma tumor was not sensitive to these compounds. The other two systems of tumors used, namely S–180 and EO771, showed a positive response to all the compounds tested. The highest percentages of tumor growth inhibition (Table 6) were obtained in the EO771 system with compounds BR–2 and BR–8 which were used in repeated experiments.

Administration of BR–8 in S–180 resulted in the highest anti-tumor activity (Table 7). BR–9 showed a positive anti-tumor activity in the S–180 tumor system.

Thus, of the six compounds submitted for anti-tumor screening, all showed positive anti-tumor effects in the Sarcoma 180 (S–180) and mouse mammary adenocarcinoma EO771. BR–2 and BR–8 proved to be the most active with respect to tumor inhibition. Tumor growth inhibitions of up to 89% were obtained by these compounds.

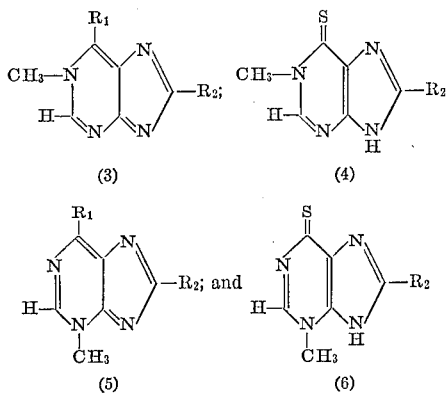

where $R_1$ is —$SCH_3$, —SH, or —$SCH_2I$; and $R_2$=pyridyl or N-methylpyridinium.

TABLE 5

| Tumor | Compound | Daily dose, mg./kg. | Route of injection | Number of treatments | Tumor response ||||
|---|---|---|---|---|---|---|---|---|
| | | | | | Mortality number/ total | Animal weight change, gr. $T/C$ | Percent inhibition of tumor growth ||
| | | | | | | | TV | TPCV |
| Ehrlich ascites carcinoma | BR–1 | 100 | I.p. | 6 | 0/6 | | 25 | 32 |
| Do | BR–2 | 500 | I.p. | 6 | 1/6 | | 46 | 47 |
| Do | BR–3 | 500 | I.p. | 6 | 0/6 | | 32 | 29 |
| Do | BR–4 | 500 | I.p. | 6 | 0/6 | | 17 | 25 |
| Do | BR–8 | 50 | I.p. | 6 | 3/6 | | 11 | 0 |
| Do | BR–9 | 100 | I.p. | 6 | 0/6 | | 67 | 69 |
| Do | BR–9 | 100 | I.p. | 6 | 1/6 | | 29 | 62 |

TABLE 6

| Tumor | Compound | Daily dose, mg./kg. | Route of injection | Number of treatments | Tumor response |||
|---|---|---|---|---|---|---|---|
| | | | | | Mortality number/ total | Animal weight change, gr. $T/C$ | Percent inhibition of tumor growth |
| E0771 | BR–1 | 100 | I.p. | 11 | 0/6 | −2 | 64 |
| E0771 | BR–1 | 100 | I.p. | 10 | 0/6 | +2 | 42 |
| E0771 | BR–2 | 500 | I.p. | 11 | 0/6 | −2 | 89 |
| E0771 | BR–2 | 100 | I.p. | 11 | 0/6 | 0 | 75 |
| E0771 | BR–3 | 500 | I.p. | 11 | 0/6 | 0 | 69 |
| E0771 | BR–4 | 500 | I.p. | 11 | 0/6 | −1 | 61 |
| E0771 | BR–4 | 100 | I.p. | 10 | 0/6 | +2 | 59 |
| E0771 | BR–8 | 50 | I.p. | 11 | 2/6 | −5 | 88 |
| E0771 | BR–8 | 50 | I.p. | 10 | 1/6 | 0 | 71 |

TABLE 7

| Tumor | Compound | Daily dose, mg./kg. | Route of injection | Number of treatments | Tumor response |||
|---|---|---|---|---|---|---|---|
| | | | | | Mortality number/ total | Animal weight change, gr. $T/C$ | Percent inhibition of tumo growth |
| S–180 | BR–1 | 100 | I.p. | 11 | 0/8 | −2 | 68 |
| S–180 | BR–1 | 100 | I.p. | 10 | 0/8 | +2 | 61 |
| S–180 | BR–2 | 500 | I.p. | 11 | 0/8 | −4 | 61 |
| S–180 | BR–2 | 500 | I.p. | 10 | 0/8 | +1 | 68 |
| S–180 | BR–3 | 500 | I.p. | 11 | 0/8 | −1 | 55 |
| S–180 | BR–4 | 500 | I.p. | 11 | 0/8 | −1 | 39 |
| S–180 | BR–8 | 50 | I.p. | 11 | 0/8 | −3 | 74 |
| S–180 | BR–8 | 50 | I.p. | 10 | 2/8 | −3 | 64 |
| S–180 | BR–9 | 100 | I.p. | 11 | 0/8 | 0 | 61 |

What is claimed is:
1. A compound selected from the group consisting of the following formulae:

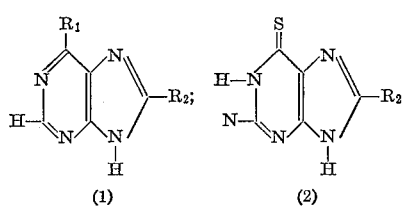

2. A compound according to claim 1, consisting of 8-(2'-pyridyl)-6-methylthio purine.

3. A compound according to claim 1, consisting of 8-(4'-N-methyl pyridinium)-3-methyl-6-methylthio purine iodide.

4. A compound according to claim 1, consisting of 8-(4'-pyridyl)-1-methyl-6-thiopurine.

5. A compound according to claim 1, consisting of 8-(4'-pyridyl)-1-methyl-6-methylthiopurine.

6. A compound according to claim 1, consisting of 8-(4'-N-methylpyridinium)-1-methyl-6-methylthio purine iodide.

7. A compound according to claim 1, consisting of 8-(2'-pyridyl)-3-methyl-6-methylthiopurine.

8. A compound according to claim 1, consisting of 8-(2'-pyridyl)-6-thio purine.

9. A compound according to claim 1, consisting of 8-(2'-pyridyl)-3-methyl-6-thiopurine.

10. A compound according to claim 1, consisting of 8-(4'-pyridyl)-6-thiopurine.

11. A compound according to claim 1, consisting of 8-(4'-pyridyl)-6-methylthio purine.

12. A compound according to claim 1, consisting of 8-(2'-pyridyl)-6 mercapto purine.

13. A compound according to claim 1, consisting of 8-(3'-pyridyl)-6 mercapto purine.

14. A compound according to claim 1, consisting of 8-(4'-pyridyl)-6 mercapto purine.

References Cited

UNITED STATES PATENTS 2,879,271   3/1959   Kallischnigg  260—256
3,015,658   2/1962   Jucker et al.  260—256

ALEX MAZEL, Primary Examiner

A. M. TIGHE, Assistant Examiner

U.S. Cl. X.R.

260—216, 253; 424—253

UNITED STATES PATENT OFFICE
CERTIFICATE OF CORRECTION

Patent No. 3,573,309  Dated March 30, 1971

Inventor(s) Felix Gotthilf BERGMANN et al.

It is certified that error appears in the above-identified patent and that said Letters Patent are hereby corrected as shown below:

Column 2, line 38, after the group of formulas, insert

-- where $R_1 = -SCH_3$, $-SH$, or $-SCH_2I$ $R_2$ = pyridyl or N-methylpyridinium.--

Column 4, Table 2, No. 23 under the heading "Bis-anion (d) delete "383" and insert --283--.

Column 5, Table 4, No. 3, under the heading "Formula" delete "$C_{10}H\ N_5 \cdot 0.5\ H_2O$" and insert --$C_{10}H_7N_5 \cdot 0.5\ H_2O$--.

Column 15, Claim 1, formula (2), delete this formula as it appears and insert the following therefor:

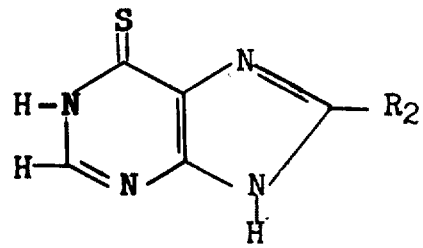

(2)

Signed and sealed this 24th day of August 1971.

(SEAL)
Attest:

EDWARD M. FLETCHER, JR.
Attesting Officer

WILLIAM E. SCHUYLER, JR.
Commissioner of Patents